June 5, 1945.  C. A. RICH  2,377,519
TOOL HOLDER
Filed Jan. 30, 1943
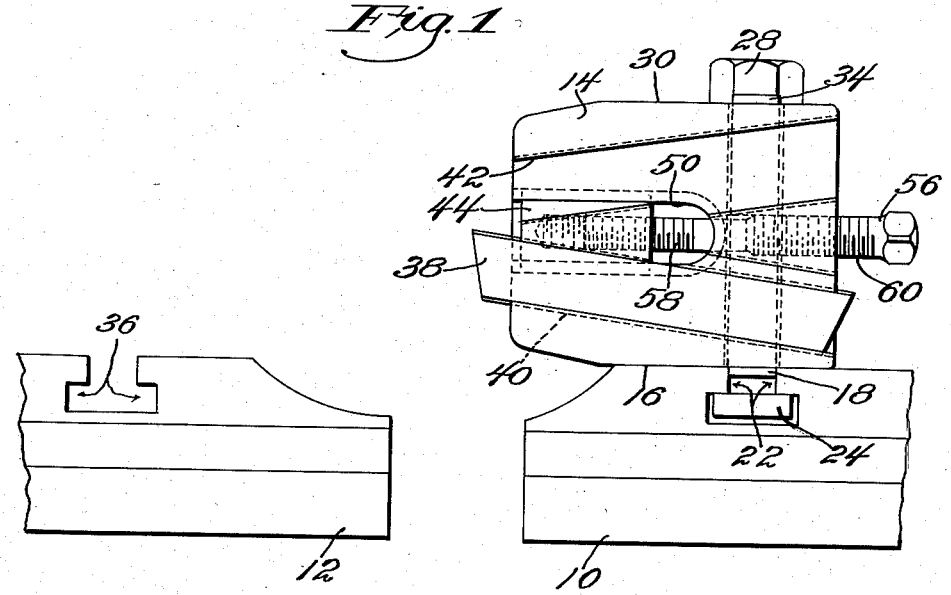
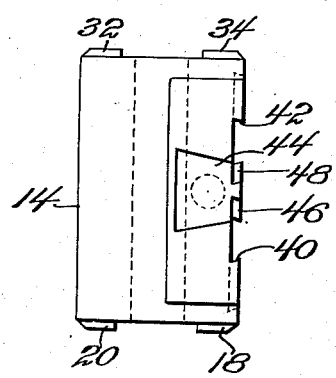
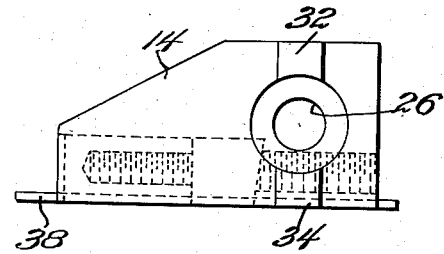
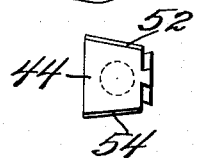
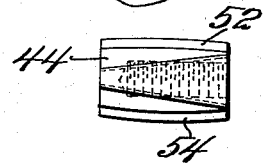
Witness:
Jas. J. Maloney.
Inventor
Charles A. Rich
by Maxwell Fish
Atty.

Patented June 5, 1945

2,377,519

UNITED STATES PATENT OFFICE 2,377,519

TOOLHOLDER

Charles A. Rich, Providence, R. I., assignor to Brown and Sharpe Manufacturing Company, a corporation of Rhode Island Application January 30, 1943, Serial No. 474,111

4 Claims. (Cl. 29—96)

The present invention relates to improvements in tool holders, and more particularly to a cutting-off tool holder of the general type adapted for use in automatic lathes or screw machines for supporting a cutting-off tool in any one of four positions at either side of the work in close proximity to the rotating work spindle or chuck. Machines of the class referred to, are provided with rotary work holding spindle assemblies capable of being driven in either direction, and cross slide supports arranged for supporting and for moving the cutting tools against the work from either side.

It is the object of the present invention to provide a novel and improved tool holder for supporting the cutting-off tool in any one of four alternate operating positions at either side of the work, which is simple and rugged in construction, is arranged to provide a firm clamping support for a cutting-off tool therein, and is readily assembled with the cutting-off tool in the desired operating position.

With these and other objects in view as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawing, in which Fig. 1 is a view of applicant's improved cutting-off tool holder with a cutting-off tool held therein, and the two cross slides of an automatic screw machine, looking at the side of the tool holder toward the work spindle; Fig. 2 is a view of the tool holder shown in Fig. 1, looking from the left, and with the cutting-off tool removed; Fig. 3 is a plan view of the tool holder shown in Figs. 1 and 2, with the cutting-off tool in place; Fig. 4 is a detail end view of the wedge clamping block for the tool holder in the position shown in Fig. 2; and Fig. 5 is a detail view in side elevation of the wedge clamping block as shown in Fig. 1.

The support for the cutting-off tool in an automatic lathe or screw machine presents a particular problem in that the tool must be supported entirely from that side which is remote from the rotating spindle or chuck to permit the severing of the work piece closely adjacent its point of support in the chuck. For the maximum efficiency in cutting, the tool is preferably supported at a slight angle from the horizontal, and this angle must be reversed when the work is rotated in the reverse direction. The angle from the horizontal at which the tool is supported also permits adjustment of the cutting portion of the tool, so that it may be brought into the horizontal plane with the work center. Cutting-off tool holders previously developed in the art, which are capable of supporting a cutting-off tool in any one of the four possible positions at either side of the work, have been so complicated in construction and so difficult of adjustment that it has been the usual practice to employ separate specially formed holders for supporting a cutting-off tool in each of the four positions. Applicant's improved universal cutting-off tool holder represents a substantial advance in the art, in that it is of the simplest possible construction comprising essentially a single block having locating surfaces on the bottom and top sides thereof to permit the block to be bolted directly to the front or rear cross slides in alternate upright and upside-down positions. On one side face of the block is provided a recessed clamping way having the sides thereof converging to provide support for a cutting-off tool in either of two alternate position angles with respect to a horizontal axis. Further in accordance with the invention, a single movable clamping element is provided in the form of a wedge member which is slidably supported for movement along the horizontal axis of the guideway, and is provided with converging undercut clamping surfaces for engagement with the inner edge of the cutting-off tool. A differential screw is provided for moving the wedge member to clamp the cutting-off tool which may be located in either of its alternate positions in accordance with the requirements of the particular job.

Referring more specifically to the drawing, in Fig. 1 is shown a front cross slide 10 and a rear cross slide 12 of an automatic screw machine, these slides being movable transversely toward and away from the rotational axis of the work. Applicant's improved cutting-off tool holder as specifically illustrated in Fig. 1, is mounted on the front cross slide 10 of the machine, and comprises a solid block 14 having a horizontal plane under surface 16 and lugs 18, 20 formed therein for locating the cutting-off tool holder 14 accurately with respect to the cross slide 10. The lugs 18, 20 are arranged to engage in an undercut holding slot 22 formed in the cross slide 10. The tool holder 14 is held rigidly in position by means of a bolt 24 having the enlarged head thereof fitted into the undercut portion of the slot 22, and passing through a bore 26 in the holder or block 14. A nut 28 screw-threaded to the upper end of the bolt 24 serves to secure the holder rigidly in position. The upper side of the block 14 is also finished to provide a horizontal plane surface 30, and has locating lugs 32, 34 formed thereon. When it is desired to support a cutting-off tool for operation at the rear side of the work on the cross slide 12, the tool holder or support 14 is turned over to an up-side-down position, and is placed on the cross slide 12 in such a position that the locating lugs 32, 34 are engaged in an undercut slot 36. For this alternative position of the tool holder, the enlarged head of the bolt 24 is engaged in the undercut slot 36 and the nut 28 screw-threaded thereto is forced against the locating surface 16 of the holder.

The holder 14 is provided on one side face thereof with recessed supporting ways arranged to receive and to support a cutting-off tool in either of two alternate positions in which the outer edge of the cutting-off tool for the lower position is engaged with an undercut clamping surface 40, and for the upper position is engaged with an undercut clamping surface 42. A cutting-off tool 38 is illustrated in Fig. 1 in the lower position supported against the clamping surface 40. The clamping surfaces 40, 42 converge so that the tool in each of its alternate positions will be correctly located for cutting engagement with the work piece. The cutting-off tool is rigidly clamped in position by means of a wedge member 44 having undercut clamping surfaces 46, 48 which converge in parallel relation to the clamping surfaces 40, 42 respectively. The wedge member 44 is in the form of a block which is fitted into an undercut guideway 50 recessed into the side face of the holder 14, and extending along the horizontal axis toward which the clamping surfaces 40, 42 converge. The outwardly sloping side walls 52, 54 of the wedge member or block 44 are curved or bulged along their length as best shown in Fig. 5, to permit the clamping surfaces 46, 48 of the wedge member 44 to adjust themselves freely to provide a firm clamping engagement along the length with the cutting-off tool.

The position of the wedge member 44 is controlled by means of an adjusting screw bolt 56 having a screw-threaded engagement with the wedge member 44, and a screw-threaded engagement with the block or holder 14. The screw thread 58 of the bolt 56 which is threaded to the wedge member, is of different pitch than the screw-threaded portion 60 which is screw-threaded into the holder 14 to provide a differential action of the clamping screw bolt 56 to insure a tight and irreversible clamping action.

It will be understood that the invention is not limited to the specific embodiment shown, and that various deviations may be made therefrom without departing from the spirit and scope of the appended claims.

What is claimed is:

1. A tool holder for use with lathe cross slide supports comprising a block having locating surfaces on the bottom and top sides thereof to permit the placing of the block in alternate upright and up-side-down positions at opposite sides of a rotating work piece, and converging recessed clamping surfaces symmetrically arranged with respect to a horizontal axis on one side face of the block, a wedge member slidably supported in the block for movement along said axis and having cooperating clamping surfaces arranged in substantially parallel relation with said converging clamping surfaces, and means for moving said wedge member to and from the clamping position.

2. A cutting-off tool holder comprising a block having locating surfaces on the bottom and top sides thereof to permit the placing of the block in alternate upright and up-side-down positions at opposite sides of a rotating work piece, two oppositely inclined tool receiving ways formed in said block converging with respect to a horizontal axis, a clamping member, means for supporting said clamping member for movement along said axis, and means for shifting said clamping member along said axis to clamp a tool alternatively in either of said converging ways.

3. A cutting-off tool holder comprising a block having locating surfaces on the bottom and top sides thereof to permit the placing of the block in alternate upright and up-side-down positions at opposite sides of a rotating work piece, means for fastening the block in each of said positions, said block having formed in a side face thereof converging recessed clamping surfaces symmetrically arranged with respect to a horizontal axis, said block having a further recessed guideway extending along said axis, a wedge member having rockered engaging surfaces for engagement with the sides of said guideway, and cooperating clamping surfaces arranged in substantially parallel relation with said converging clamping surfaces respectively, for engaging a cutting-off tool there-between, and an adjusting screw for moving the wedge member to and from the clamping position.

4. A cutting-off tool holder comprising a block having locating surfaces on the bottom and top sides thereof to permit the placing of the block in alternate upright and up-side-down positions at opposite sides of a rotating work piece, said block having formed on one side face thereof converging recessed clamping surfaces symmetrically arranged with respect to a horizontal axis, and a further recessed guideway extending along said axis, a wedge member slidably supported in said guideway for movement along said axis and having cooperating clamping surfaces arranged in substantially parallel relation with said converging clamping surfaces respectively to clamp the cutting-off tool therebetween, and an adjusting screw having a differential threaded engagement with the block and said wedge member for moving the wedge member to and from clamping position.

CHARLES A. RICH.